(12) United States Patent
Hanai et al.

(10) Patent No.: US 7,716,522 B2
(45) Date of Patent: May 11, 2010

(54) INFORMATION PROCESSING SYSTEM AND METHOD FOR EXECUTING PROCESS DURING COMMUNICATION ERROR

(75) Inventors: Takehiko Hanai, Yokohama (JP); Yoji Iwata, Yamato (JP); Ryuji Hayashi, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 400 days.

(21) Appl. No.: 11/693,983

(22) Filed: Mar. 30, 2007

(65) Prior Publication Data

US 2008/0091970 A1 Apr. 17, 2008

(30) Foreign Application Priority Data

Oct. 12, 2006 (JP) ............................. 2006-278706

(51) Int. Cl.
G06F 11/00 (2006.01)
G06F 11/20 (2006.01)

(52) U.S. Cl. ............................. 714/13; 714/15; 714/56; 709/205; 709/228

(58) Field of Classification Search ..................... 714/4, 714/18, 56, 13, 15; 709/205, 228
See application file for complete search history.

(56) References Cited

U.S. PATENT DOCUMENTS 5,621,885 A * 4/1997 Del Vigna, Jr. ................ 714/13
5,832,201 A * 11/1998 Hirayama et al. ............. 714/13
6,449,733 B1 * 9/2002 Bartlett et al. ................ 714/13
6,721,288 B1 4/2004 King et al.
2005/0144200 A1 * 6/2005 Hesselink et al. ........... 707/204
2005/0198379 A1 * 9/2005 Panasyuk et al. ............ 709/239
2006/0190719 A1 * 8/2006 Rao et al. .................... 713/160
2006/0190766 A1 * 8/2006 Adler et al. ................... 714/13
2007/0083655 A1 * 4/2007 Pedersen ..................... 709/226

FOREIGN PATENT DOCUMENTS

| JP | 05-143498 | 6/1993 |
| JP | 06-230995 | 8/1994 |
| JP | 10-149326 | 6/1998 |
| JP | 2000-148572 | 5/2000 |

* cited by examiner

*Primary Examiner*—Scott T Baderman
*Assistant Examiner*—Joseph Schell
(74) *Attorney, Agent, or Firm*—Mattingly & Malur, P.C.

(57) ABSTRACT

In information processing between computers which perform a remote operation via a network, all or a part of process information being executed by an operation target and data for use in a process are transmitted beforehand to an operation unit, and the operation unit continues the processing by use of the process information transmitted beforehand when connection via the network for communication between the computers is interrupted or cut. When it is detected that the communication returns to a normal state, the process information being executed by the operation unit and the data for use in the process are transmitted to the operation target, and the operation target continues execution of an information processing program by use of the received process information and the data for use in the process.

17 Claims, 9 Drawing Sheets

130 COPYING TARGET AP LIST TABLE

| APPLICATION NAME | PROCESS NAME | MODULE NAME | SIZE | PRIORITY |
|---|---|---|---|---|
| APPLICATION 1 | PROCESS 1 | MODULE 1-1 | 4MB | 1 |
|  |  | MODULE 1-2 | 2MB | 2 |
| APPLICATION 2 | PROCESS 2 | MODULE 2-1 | 3MB | 1 |
| APPLICATION 3 | PROCESS 3 | MODULE 3-1 | 7MB | 1 |

123 HOST SIDE PROCESS CONTROL TABLE

| PID | STATE | REGISTER | ADDRESS INFORMATION |
|---|---|---|---|
| 0274 | EXECUTABLE |  |  |
| 0cd8 | AWAITING EXECUTION |  |  |
| 00b4 | BEING EXECUTED |  |  |

DESIGNATE ADDRESS

INFORMATION PROCESSING SYSTEM AND METHOD FOR EXECUTING PROCESS DURING COMMUNICATION ERROR

INCORPORATION BY REFERENCE

This application relates to and claims priority from Japanese Patent Application No. 2006-278706 filed on Oct. 12, 2006, the entire disclosure of which is incorporated herein by reference.

BACKGROUND OF THE INVENTION

The present invention relates to an information processing system, an information processing method and an information processing device in which information processing can be continued in response to an operation input even in a case where fault is generated in communication between a first information processing device which accepts an operation input and a second information processing device which executes the information processing in response to the operation input.

A technology has been known in which a notebook-size personal computer (PC), a low-performance PC and the like access a high-performance PC and a server via a network to perform a remote operation.

In recent years, from viewpoints of security and information leakage prevention, an information processing system is put to practical use in which a storage unit such as a hard disk is not mounted on a first information processing device (hereinafter referred to also as an operation unit or a user computer) operated by an operator. In a case where the operator inputs operation information by use of a keyboard, a mouse and the like, the operation information is transmitted to a second information processing device (hereinafter referred to also as an operation target or a host computer) remotely connected via the network. The operation target processes the operation information, and transmits a result of the information processing as image data to the operation unit. The image data is displayed in a display of the operation unit.

In such an information processing system, the operation unit performs the input of the operation information and the display of the information processing result only, and any information is not stored in the operation unit. Therefore, even if the operation unit is lost or stolen, the information leakage can be prevented.

In such an information processing system, the operation unit does not execute any information processing. The remote operation target connected via the network executes the information processing. Therefore, if the connection via the network is interrupted or cut, the information cannot be processed. For example, when the operation unit accesses the operation target via a cellular phone network to perform a remote operation and the operation unit moves to the outside of the sphere of electric waves of the cellular phone network, the connection is cut, and then the subsequent operation cannot be continued. Therefore, in a case where the remote operation is performed in, for example, a train, the connection is interrupted every time the train passes through a tunnel, and the remote operation is interrupted.

To solve the problem, a technology is developed in which the operation can continuously be performed, even when the connection via the network is interrupted or cut (see, e.g., JP-A-2000-148572, JP-A-6-230995 and JP-A-10-149326).

SUMMARY OF THE INVENTION

JP-A-2000-148572 is directed to a technology in which operation information input by an operator is stored in an operation unit while connection via a network is cut, and the stored operation information is transmitted to an operation target in a case where the connection via the network is resumed.

Moreover, Patent Document 2 is directed to a dual computer system in which operations of central processing units (CPU) and memories of a plurality of computers are synchronized, and the same processing is performed by the plurality of computers.

The present invention provides an information processing system, an information processing method and an information processing device in which information processing can be continued in response to an operation input even in a case where fault is generated in communication between an operation unit and an operation target.

Other objects, features and advantages of the invention will become apparent from the following description of the embodiments of the invention taken in conjunction with the accompanying drawings.

DESCRIPTION OF THE EMBODIMENTS

Figure 1:
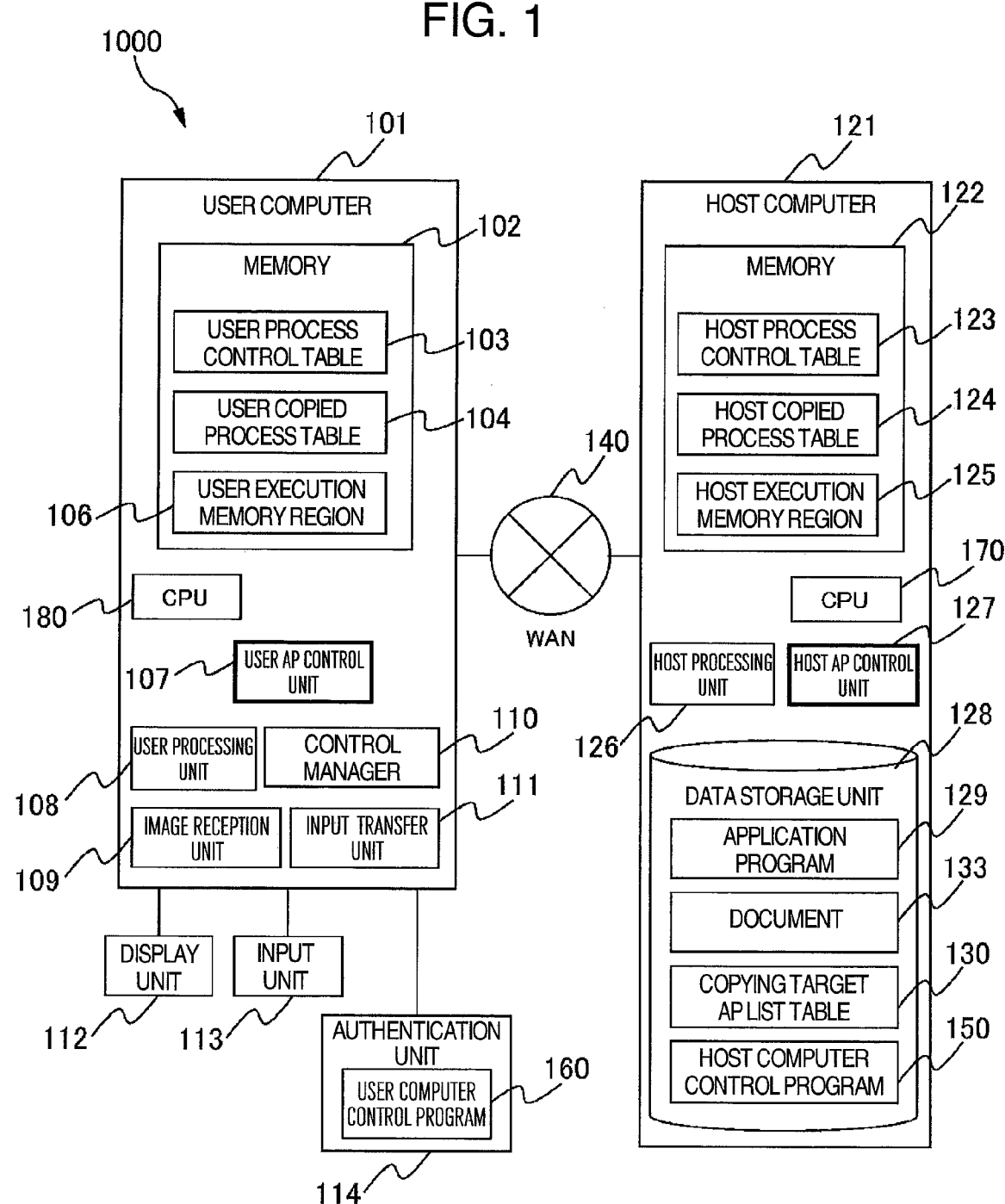
FIG. 1 is a diagram showing an example of the whole configuration of an information processing system.

One aspect of the present invention is directed to an information processing system including a first information processing device and a second information processing device, the first information processing device including an input transmitting unit which transmits, to the second information processing device, input data to be transferred to a process executed in the second information processing device; a user interface which outputs a processing result received from the second information processing device; a monitoring unit which monitors communication between the first information processing device and the second information processing device; and an execution monitoring unit which starts execution of the process based on configuration data for use in the execution of the process of the second information processing device, received from the second information processing device, in a case where it is detected that fault is generated in the communication between the first information processing device and the second information processing device, the second information processing device including a transmitting unit which receives the input data to transmit, to the first information processing device, a result of the processing executed by transferring the input data to the process; and a configuration data control unit which transmits, to the first information processing device, the configuration data for use in the execution of the process.

According to such an aspect, even when the fault is generated in the communication between the first information processing device and the second information processing device, information processing in response to an operation input can be continued. For example, in a case where an operator edits text data by use of the first information processing device at a place where the operator travels on business, when the communication between the first information processing device and the second information processing device is interrupted, the configuration data of the process which has been executed for the edition of the text data in the second information processing device is also stored beforehand in the first information processing device. Moreover, the execution of the configuration data of the process is started in the first information processing device. In consequence, the operator may continuously edit the text data. Needless to say, the configuration data of the process includes data being processed. Therefore, the operator may continue the edition of the text data continuously from a state immediately before the communication is interrupted.

Here, in general, when an information processing program is executed by a computer, an operating system (OS) generates the process, and process information is registered in a table controlled by the OS. Moreover, data such as execution codes, stacks and variables for use in the process is stored in a memory. In a multitask OS, one process is not constantly executed, the process has one of a state being executed, an executable state and a state awaiting execution, and transition of the state is repeated. When the state of the process changes to the executable state, register information of a CPU is retreated in the process information controlled by the OS. Therefore, the process including a state of the process being executed can be registered in the different computers when the process is brought into the executable state, and the process information controlled by the OS and the data stored in the memory for use in the process are acquired and registered in different computers.

According to the aspect of the present invention, during information processing between the computers which perform a remote operation via a network, all or a part of the information processing program being executed by an operation target, and an execution state of the information processing program and data for use in the information processing program are transmitted beforehand to an operation unit. Even when a connection state via the network is interrupted or cut, the information processing program of the operation unit can be executed.

Moreover, in a case where it is detected that the communication returns to a normal state, the execution monitoring unit transmits the stored configuration data to the second information processing device, and the configuration data control unit receives the configuration data from the first information processing device to store the data. Moreover, the execution of the process can be started based on the configuration data.

In the aspect of the present invention, when the connection via the network is resumed, the execution state of the information processing program being executed by the operation unit and the data for use in the information processing program are transmitted to the operation target. The operation target continues the execution of the information processing program by use of the received execution state of the information processing program and the data for use in the information processing program.

According to such an aspect, in a case where the communication returns to the normal state, the second information processing device can be controlled to return to such a state as to execute the information processing in response to the operation input.

Moreover, the configuration data of the above processes includes a plurality of program modules which realize functions by executing the processes. When a storage unit of the second information processing device records a data size of each program module and the configuration data control unit transmits the configuration data to the first information processing device, the configuration data may be transmitted to the first information processing device so that a total value of the data sizes of the program modules transmitted to the first information processing device does not exceed a predetermined value.

According to such an aspect, an amount of the data to be transmitted from the second information processing device to the first information processing device can be suppressed. The data size of the configuration data of the process differs with the process. Therefore, a communication circuit might be suppressed, depending on the data size. To solve this problem, the configuration data of the process is transmitted to the first information processing device so that the total value of the data sizes of the program modules transmitted to the first information processing device does not exceed the predetermined value. Here, each program module realizes each function by executing the process, and is constituted of, for example, a dynamic link library (DLL) and the like.

Furthermore, in a case where it is not detected for a predetermined period that the fault is generated in the communication between the first information processing device and the second information processing device, the monitoring unit may detect that the communication between the first information processing device and the second information processing device returns to the normal state.

According to such an aspect, even if the communication has an unstable state, the first information processing device continues the execution of the process. The information processing can stably be continued.

In addition, the execution monitoring unit may monitor a free capacity of a memory disposed in the first information processing device, compare the free capacity with a predetermined value, and stop the writing of the configuration data transmitted from the second information processing device in the memory.

According to such an aspect, when, for example, the free capacity of a memory disposed in the first information processing device is smaller than the predetermined value, the writing of the configuration data of the process is stopped. In consequence, the configuration data of the process already written in the memory can be protected. Therefore, even if the first information processing device has a comparatively small memory capacity, the information processing can stably be executed.

Moreover, the execution monitoring unit may monitor whether or not an authentication unit which specifies the operator of the first information processing device is mounted, and stop the execution of each process in a case where it is detected that the authentication unit has been removed.

According to such an aspect, only when the authentication unit is mounted and the operator may be specified, the first information processing device can execute the information processing. Therefore, an illegal operation by the third party cannot be accepted. In consequence, leakage of the information can be prevented, and security can be secured.

Even in a case where the fault is generated in the communication between the first information processing device which accepts the operation input and the second information processing device which executes the information processing in response to the operation input, the information processing in response to the operation input can be continued.

The whole configuration of an information processing system 1000 according to the present embodiment is shown in FIG. 1.

The information processing system 1000 is constituted by communicatably connecting a user computer 101 to a host computer 121 via a network 140. It is to be noted that the user computer 101 corresponds to a first information processing device claimed.

In the information processing system 1000 according to the present embodiment, when an operator inputs operation information (input data) into the user computer 101 by use of a keyboard, a mouse and the like, the operation information is transmitted to the host computer 121. Moreover, the host computer 121 processes the operation information to transmit a result of the information processing as image data to the user computer 101. The user computer 101 displays the image data in a display.

The user computer 101 is a computer to be operated by the operator. The computer can be constituted of, for example, a notebook-size personal computer.

The user computer 101 includes a CPU 180, a memory 102, an input transfer unit 111 and an image reception device 109. The user computer 101 is connected to an input unit 113, an authentication unit 114 and a display unit 112.

It is to be noted that the user computer 101 according to the present embodiment does not include any hard disk drive. In consequence, illegal take-out of the information, leakage of stolen information and the like are prevented. Needless to say, the user computer 101 may include the hard disk drive.

The CPU 180 is a unit which controls the whole user computer 101. The CPU 180 reads out a user computer control program 160 stored in the authentication unit 114 into a user execution memory region 106 of the memory 102 to execute the program. In consequence, various functions of the user computer 101 are realized. For example, as shown in FIG. 1, a user AP control unit 107, a user processing unit 108 and a control manager 110 are realized. The user computer control program 160 can be realized by a program which functions as an operating system (hereinafter referred to also as the OS).

It is to be noted that FIG. 1 shows that a user process control table 103 and a user copied process table 104 are stored in the memory 102. With reference to these tables, a process to be executed by the host computer 121 is executed by the user computer 101 in response to the operation information input into the user computer 101. Details will be described later.

The input unit 113 is a unit which is constituted of a keyboard, a mouse, a microphone and the like and which functions as a user interface in a case where the operator inputs the information into the user computer 101.

The display unit 112 is a unit which is constituted of a display, a speaker and the like and which functions as the user interface in outputting information such as a result of the execution of the processing of the information received from the host computer 121.

The authentication unit 114 is a unit which specifies the operator who operates the user computer 101. The authentication unit 114 contains an IC card, and inherent authentication information which specifies the operator, the user computer control program 160 and the like are recorded in the IC card.

When the operator uses the user computer 101, the authentication unit 114 is first attached or connected to the user computer 101. Moreover, the user computer 101 executes predetermined authentication to authenticate the operator. When the operator passes the authentication, the CPU 180 reads the user computer control program 160 into the memory 102 to start the execution. In consequence, the operator may use the user computer 101.

When the control manager 110 detects that the authentication unit 114 is attached or connected to the user computer 101, a dialog for inputting a password is displayed in the display unit 112 of the user computer 101. Next, the control manager 110 authenticates the authentication unit 114 attached to the user computer 101 by use of a public key cipher board or the like based on the password input by the operator using the input unit 113 and authentication information inherent in the authentication unit 114. Next, when the authentication unit 114 is authenticated, the control manager 110 stores, in the user computer 101, information indicating that the authentication unit 114 has been authenticated. It is to be noted that the authentication unit 114 has a one-to-one correspondence with the operator, and different operations have different authentication units 114.

When the user computer 101 performs a remote operation of the host computer 121, first the operator is authenticated. Subsequently, connection between the user computer 101 and the host computer 121 for the remote operation is authenticated. When both of the authentication of the operator and the authentication of the remote operation are passed, the operator may perform the remote operation.

During the remote operation, information (hereinafter referred to also as the input information) which is input into the input unit 113 of the user computer 101 by the operator is captured by the input transfer unit 111. Moreover, the input transfer unit 111 transfers a key code of the information input with the keyboard or an input event of the information input with the mouse to the host computer 121 via the network 140.

The host computer 121 executes an information processing in response to the received input information, and transmits the result of the processing as a screen display data of a bitmap form or JPEG form to the user computer 101.

The user computer 101 displays the screen display data received by the image reception device 109 in the display unit 112 of the user computer 101. A display image may be displayed in the whole screen of the display unit 112 or displayed as one window.

In this manner, the operator may execute an application of the host computer 121 by use of the display unit 112 of the user computer 101, while seeing the screen displayed in the display unit 112.

The host computer 121 is a computer which executes information processing according to information input into the user computer 101 by the operator and which transmits a result of the execution to the user computer 101. The host computer 121 includes a CPU 170, a memory 122 and a data storage unit 128.

The CPU 170 is a unit which controls the whole host computer 121. The CPU 170 reads a host computer control program 150 stored in the data storage unit 128 constituted of a hard disk drive or the like into a host execution memory region 125 of the memory 122 to execute the program. In consequence, various functions of the host computer 121 are realized. For example, a host AP control unit 127 and a host processing unit 126 shown in FIG. 1 are realized. The host computer control program 150 can be realized by a program which functions as an operating system.

Moreover, the CPU 170 may perform the host computer control program 150 so that information processing can be executed according to the information input into the user computer 101 by the operator and an execution result can be transmitted to the user computer 101. For example, the host computer 121 reads out an application program 129 and a document 133 stored in the data storage unit 128 into the host execution memory region 125 of the memory 122 to execute the processing, and the host computer transmits an execution result to the user computer 101 in response to a command or data transmitted from the user computer 101.

Usually, when the host computer 121 executes the application program 129 to edit the document 133, the operating system (OS) substantially performs the following processing.

First, the OS generates a process of the application program 129 to be executed. The generated process is registered in, for example, a host process control table 123 shown in FIG. 3, and controlled by the OS. The CPU 170 successively switches the processes generated by the OS to execute the processes.

The host process control table 123 is a table in which process information of each process to be executed by the host computer 121 is stored. The host process control table 123 includes "PID", "state", "register" and "address information" columns.

In the "PID" column, a process ID (PID) for uniquely identifying each process is described.

In the "state" column, information indicating an execution state of each process is described. The process takes states "being executed", "executable" and "awaiting execution". The state "being executed" indicates a state in which the process is executed by the CPU 170. The "executable" state is a state of a process which is not "being executed" among the processes to be successively executed by the CPU 170. The state "awaiting execution" is a state of the process on a waiting list for the execution by the CPU 170. For example, the state is achieved in a case where an input/output processing of the data with respect to a hard disk or the like is generated, and the process waits for end of the input/output processing.

In the "register" column, information stored in a register of the CPU 170 is described. When the process in the state "being executed" changes to the "executable" state, the information stored in the register of the CPU 170 is stored in the "register" column. Conversely, when the process in the "executable" state changes to the state "being executed", the information stored in the "register" column is read out into the register of the CPU 170.

In the "address information" column, an address of the host execution memory region 125 in which data such as an execution code (a program code) of the process and a stack are stored, and a size of the data and the like are recorded.

Configuration data of the process is data for use in the execution of the process, and includes the execution code (the program code) of the process and data being processed. The data being processed includes data stored in the stack and data (process information) stored in the above columns of the host process control table 123. For example, the data being processed includes data such as data including a global variable and the document 133 and the stack including a local variable, an argument for calling a function and the like.

Moreover, the execution code of the process sometimes includes a plurality of program modules which realize the functions by executing the process. One program module has one or a plurality of functions. The program module is added to the process to thereby add the function to the process. As one example of the program module, there is a dynamic link library (DLL).

When the process includes a plurality of program modules, the host execution memory region 125 also retains the execution code, the data and the stack of each program module. In the "address information" column of the host process control table 123, information such as an address and a size of a region in which the data of each program module is stored in the host execution memory region 125 is stored.

Figures 2, 3:
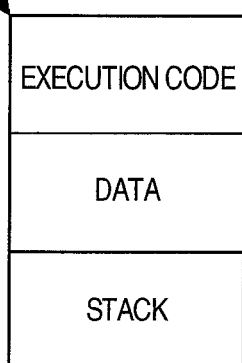
FIG. 2 is a diagram showing an example of a copying target AP list table.
FIG. 3 is a diagram showing an example of a host process control table.

When the state of the process changes from the state "being executed" to the "executable" state, the information stored in the register of the CPU 170 is retreated in the "register" column of the host process control table 123. FIG. 3 shows an example of the process constituted of one program module. In the example, the process information is registered in the host process control table 123 controlled by the OS. In the "address information" column of the host process control table 123, information such as an address of the host execution memory region 125 in which the execution code of the process, the data, the stack and the like are retained is stored.

FIG. 2 shows one example of a copying target AP list table 130 stored in the data storage unit 128 of the host computer 121. The copying target AP list table 130 is a table for controlling a process to be copied in the user computer 101 among the processes to be executed by the host computer 121 in response to the operation input into the user computer 101. The copying target AP list table 130 includes "application name", "process name", "module name", "size" and "order of priority" columns.

A process to prepare the copying target AP list table 130 of FIG. 2 will hereinafter be described. When a user executes an application, a process is generated. When the process is generated, the execution code, the data and the stack are developed in the execution memory region, and the process information is registered in the host process control table 123.

At this time, with reference to a PID of the registered process, the process name uniquely corresponding to the PID is registered in the process name of the copying target AP list table 130. The PID has a one-to-one correspondence with the process name in a table (not shown).

In the address information of the host process control table 123, the module name of the process and the address where the module is stored are registered. A size of the module is acquired from a top position and an end position of the address where the module is stored, and the module name and the size are registered in the copying target AP list table 130.

In the "application name" column, identification information of the application program to be executed by the host computer 121 is described.

In the "process name" column, information for identifying the process to be generated by the OS during the execution of the application program 129 specified by the identification information described in the "application name" column is stored.

In the "module name" column, identification information of the program module constituting the process is stored.

When one process includes a plurality of program modules, the identification information of each program module is described.

In the "size" column, a size of each program module is stored.

In the "order of priority" column, information indicating the order of priority in a case where each program module constituting the process is copied in the user computer 101 is stored. It is preferable to set the order of priority so that the program module corresponding to a function having a high frequency with which the operator of the user computer 101 uses has a high priority.

To set the order of priority, the copying target AP list table 130 prepared by the generation of the process is displayed in the display, and an input of the order of priority for each application is accepted from the user. The user may finely designate the order of priority among the modules.

Moreover, only an application name may be displayed to specify only a priority of the application. In this case, there is no difference between the modules, and the only degrees of priorities of the applications are designated. For example, the degree of priority of document preparation software is set to 1, the degree of priority of table calculation software is set to 2 and the degree of priority of presentation software is set to 3. In a case where the order of priority of the applications are specified in this manner, when these types of software are simultaneously started, the modules of the applications are transferred in order of priority.

Furthermore, the order of priority may dynamically be set. For example, every time the program module is used, the program module is set to the maximum priority, and the priority of the recently used program module is set to be high. Alternatively, the numbers of times when the program module is used are counted, and the priority of the program module having a large number of the use times is set to be high.

In addition, the order of priority may be set for each application program 129. In this case, the duplicate of the process can be transmitted to the user computer 101 in accordance with the order of priority for each application program 129. For example, the process of the application program 129 having the high priority may be transmitted to the user computer 101 in preference to another process.

For example, in a case where processes of both of a text edition program and a spread sheet program cannot be executed by the user computer 101 for the reason of a small capacity of the memory of the user computer 101, when the priority of the table calculation program is set to be higher than that of the text data edition program, the process of the table calculation program can preferentially be transmitted to the user computer 101.

Next, in the information processing system 1000 according to the present embodiment, one example of a flow of processing will be described with reference to a flow chart of FIG. 7 in a case where a duplicate of the process to be executed by the host computer 121 in response to the operation input transmitted from the user computer 101 is transmitted to the user computer 101.

First, the host AP control unit 127 of the host computer 121 monitors the host process control table 123. When it is detected that the process registered in the copying target AP list table 130 is brought into the executable state (S1000), the corresponding process information is transmitted from the host process control table 123 to the user computer 101 (S1010, 1020).

Moreover, the host computer 121 selects the program modules constituting the process with reference to the copying target AP list table 130 (S1030). Furthermore, the host computer 121 acquires the address and the size of each program module constituting the process in the host execution memory region 125 from the address information column of the host process control table 123 (S1040).

When the process includes a plurality of program modules, the host computer 121 acquires the sizes of the program modules from the copying target AP list table 130, and starts selecting the program module in order of priority.

At this time, the host computer 121 selects the size of the program module so that the total size of the program modules fall in a predetermined threshold range. Moreover, the host computer 121 acquires the address and the size of the host execution memory region 125 in which the selected program module is stored from the address information column of the host process control table 123, and transmits, to the user computer 101, the data recorded in the acquired address (S1050, S1060).

A threshold value of a transfer size of the program module is stored in the memory 122 or the data storage unit 128 of the host computer. An administrator specifies and stores this threshold value beforehand, but the threshold value may be changed in accordance with a transfer rate. When the user computer 101 is connected to the host computer 121 via a network such as a network cable having a large transfer rate, the threshold value is set to a large value. When the user computer is connected to the host computer via a network such as a cellular phone having a small transfer rate, the threshold value is set to a small value.

When the process includes only one program module, the size of the program module is compared with the threshold value. When the size of the program module is equal to or smaller than the threshold value, the data recorded in the host execution memory region 125 is transmitted to the user computer 101. When the size of the program module is larger than the threshold value, the data stored in the host execution memory region 125 is not transmitted, and the processing ends.

A procedure to select the program module of the copying target process will hereinafter be described with reference to FIG. 2. It is assumed that the administrator specifies a threshold value of 5 MB.

When the process information of process 1 is transmitted, as shown in FIG. 2, the process 1 includes two program modules 1-1 and 1-2. When the sizes of the modules are added up in order from priority, the module 1-1 has a size of 4 MB which is smaller than the threshold value. However, when the size of the second module 1-2 is added, the total size is 6 MB in excess of the threshold value.

Therefore, in this case, the host computer 121 selects the only module 1-1, and transmits, to the user computer 101, data corresponding to the module 1-1 in the host execution memory region 125.

Moreover, when process information of process 2 is transmitted, as shown in FIG. 2, the process 2 includes, for example, only one module 2-1. The module 2-1 has a size of 3 MB which is smaller than a threshold value of 5 MB. Therefore, the module 2-1 is a copying target.

When process information of process 3 is transmitted, the process 3 also includes only one module 3-1. The module 3-1 has a size of 7 MB which is larger than a threshold value of 5 MB. Therefore, the module 3-1 is not the copying target.

In the example of FIG. 2, the order of priority is defined among the modules. Moreover, the order of priority among the applications may be defined in addition to the order of priority among the modules in the copying target AP list table 130. For example, a case where the order of priority among the applications has a higher priority than the order of priority among the modules is considered. The order of priority of application 3 is set to a first application, the order of priority of application 1 is set to a second application, and the order of priority of application 2 is set to a third application. This indicates that all of the modules of the application 3 are transmitted up to the threshold value of the transfer size, then all of the modules of the application 1 are transmitted, and all of the modules of the application 2 are then transmitted. When the threshold value of a data size is set to 15 MB, a module 3-1 (7 MB), a module 1-1 (4 MB) and a module 1-2 (2 MB) are transferred in this order. The total transfer size of these modules is 13 MB. When the next module 2-1 having a size of 3 MB is transferred, the threshold value is exceeded. Therefore, the module 2-1 is not transferred.

A case where the priority among the modules has a higher priority than the priority among the applications is considered. This indicates that the only module of priority 1 is first transferred up to the threshold value of the transfer size in order of priority among the applications. Subsequently, the module of priority 2 is transferred in order of priority among the applications. In the above example, the module 3-1 (3 MB), the module 1-1 (4 MB) and the module 2-1 (3 MB) are transferred in this order. Subsequently, the module of priority 2 is transferred, but the transferred modules have a total size of 14 MB. Since the module 1-2 (2 MB) exceeds the threshold value, the module 1-2 is not transferred.

Figure 7:
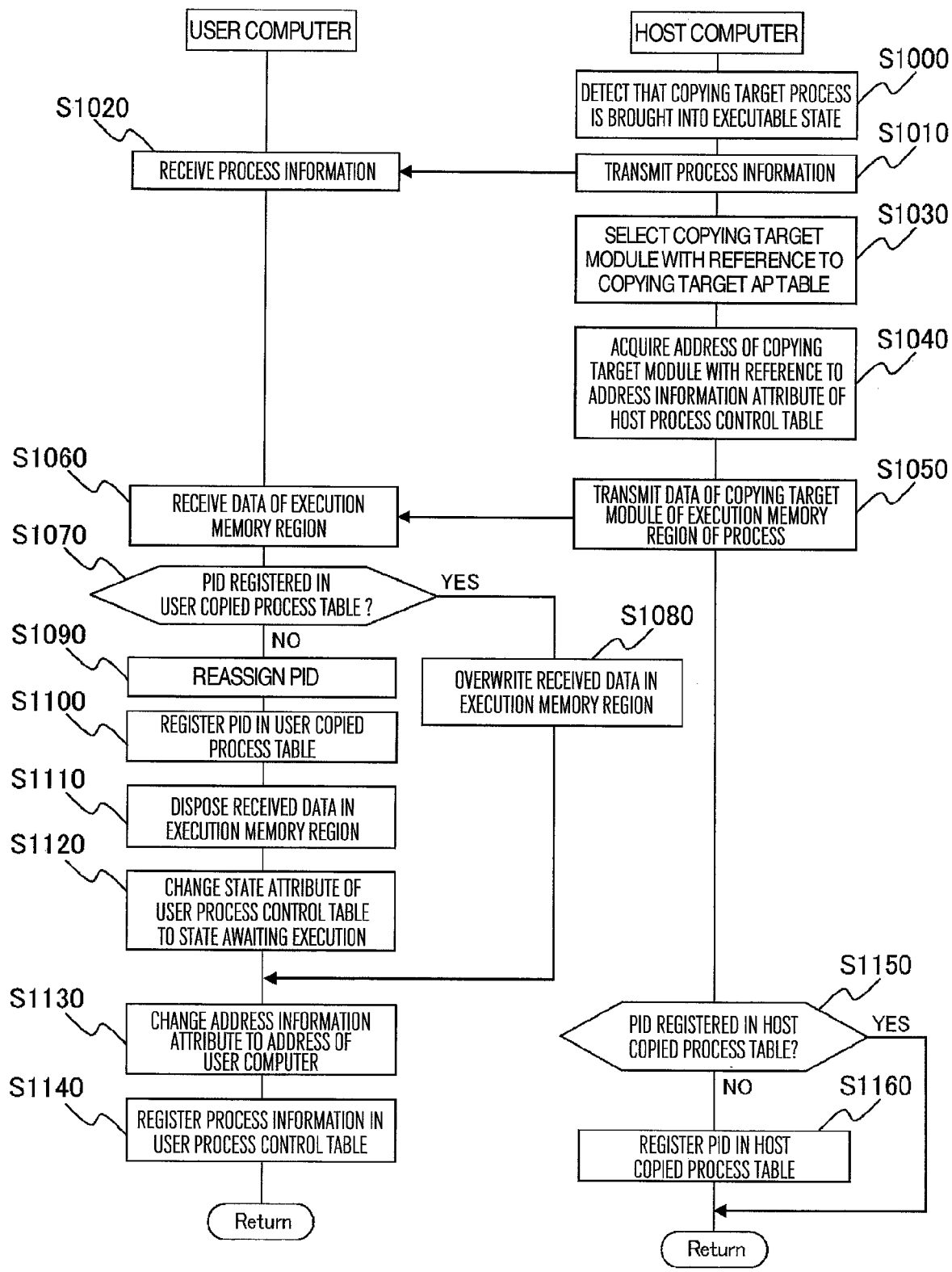
FIG. 7 is a flow chart showing an example of a flow of process copying.

Turning back to the flow chart of FIG. 7, when the PID described in the process information transmitted to the user computer 101 is not registered in a host copied process table 124, the host computer 121 registers the PID of the process in the host copied process table 124 (S1150, S1160).

Figures 4, 5, 6:
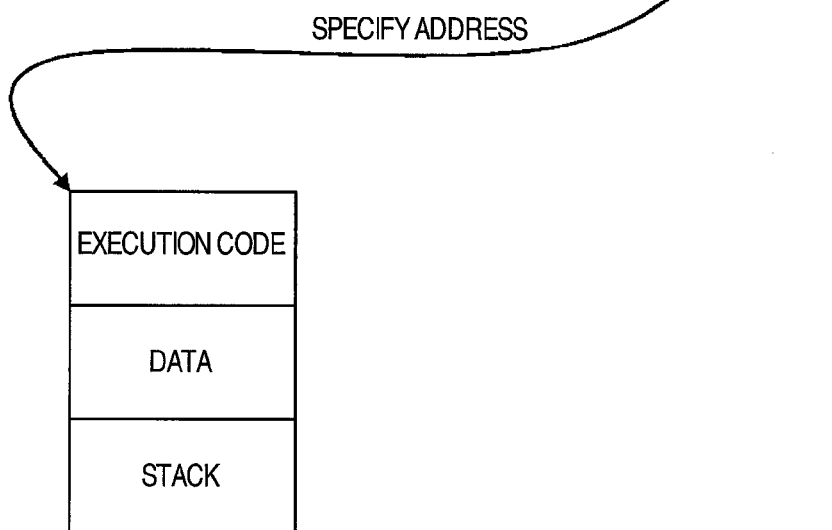
FIG. 4 is a diagram showing an example of a host copied process table.
FIG. 5 is a diagram showing an example of a user process control table.
FIG. 6 is a diagram showing an example of a user copied process table.

Here, the host copied process table 124 is a table shown in FIG. 4, and holds the PID of each process transmitted from the host computer 121 to the user computer 101. The host copied process table 124 is stored in the memory 122 of the host computer 121.

On the other hand, the user AP control unit 107 of the user computer 101 receives the process information transmitted from the host computer 121 (S1020). Subsequently, the user AP control unit receives the data of the execution memory region (S1060).

If the PID of the received process information is not registered in the user copied process table 104 (S1070), the user computer 101 assigns a new PID for uniquely identifying the process in the user computer 101. The newly assigned PID is associated with the original PID to register the process information in the user copied process table 104 (S1100).

The user copied process table 104 is a table shown in FIG. 6, and stored in the memory 102 of the user computer 101. The user copied process table 104 is a table which associates the process of the host computer 121 with that of the user computer 101, and associates the PID of the process of the host computer 121 with the PID assigned by the user computer 101 in a case where the process is transmitted to the user computer 101 to retain the PIDs.

Subsequently, the user computer 101 stores the data received in the step S1060 in a free area of the memory 102 (S1110). Moreover, the user computer 101 changes the state of the process described in the process information received in the S1020 to the state "awaiting execution" (S1120), and changes the address information to the address of the user execution memory region 106 (S1130). Moreover, the user computer 101 registers the changed process information in the user process control table 103 (S1140).

It is to be noted that if the PID of the process information received from the host computer 121 is registered in the user copied process table 104 (S1070), the data of the execution memory region received in the step S1060 is overwritten in the address of the user execution memory region 106 described in the address information column of the user process control table 103 (S1080), and the address information column of the user process control table 103 is updated (S1130). Subsequently, the user computer 101 updates process information such as a register attribute of the user process control table 103 (S1140).

FIG. 5 is a diagram showing an example of the user process control table 103. The user process control table 103 is controlled by the OS of the user computer 101, and has attributes of the PID, the state, the register and the address information.

On receiving the process information of the host process control table 123 from the host computer 121 in the step S1020, the user computer 101 registers the register attribute of the process information received by the user computer in the register of the user process control table. The user computer 101 arranges the execution code, the data and the stack received in the step S1060 in the free area of the memory in S1110.

Moreover, the user computer 101 registers the address of the area where the data is arranged in the step S1110 in the address information attribute of the user process control table in the step S1130.

Here, the user computer 101 monitors an available capacity of the memory 102. In a case where the user AP control unit 107 receives the data of the host execution memory region from the host computer 121 in the step S1060, when the available capacity of the memory 102 is below a threshold value, the user AP control unit 107 may stop the writing of the process information and the data of the host execution memory region in the memory 102. In consequence, even when an amount of the memory 102 mounted on the user computer 101 is smaller than that of the memory 122 mounted on the host computer 121, the configuration data of the process already written in the memory 102 of the user computer 101 can be protected.

Figure 12:
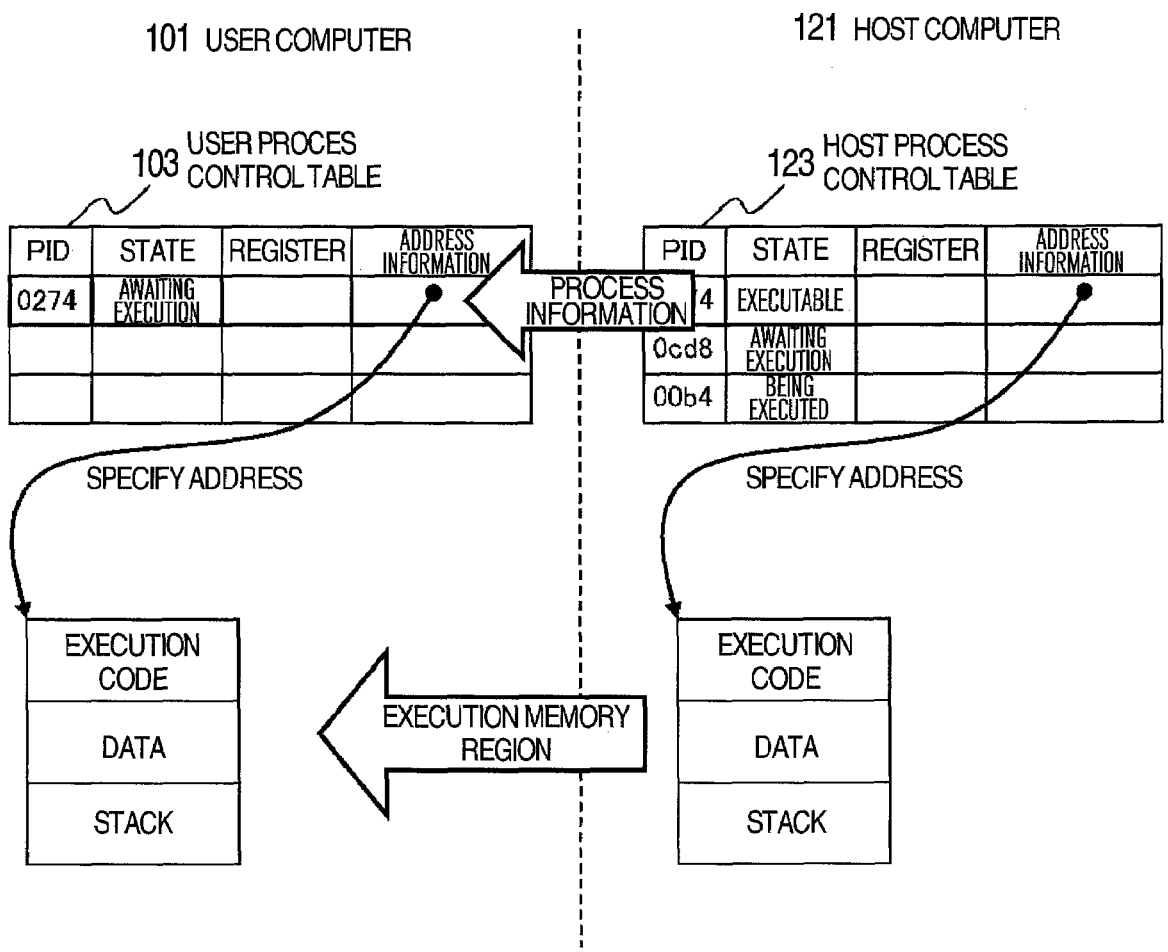
FIG. 12 is a diagram showing an outline of an example of process copying.

An outline of the above information processing is shown in FIG. 12. That is, when the process is brought into the executable state in the host computer 121, the information of the register of the CPU 170 is retreated in the host process control table 123. At this timing, the host computer 121 transmits the process information to the user computer 101. Moreover, the user computer 101 registers the process information transmitted from the host computer 121 in the user process control table 103, and changes the state of the process to the state awaiting the execution.

Moreover, the host computer 121 transmits, to the user computer 101, all data from a start address of the host execution memory region 125 of the process to an end address of the region, and the user computer 101 arranges the data in the free area of the memory 102. Furthermore, the user computer 101 describes the address of the user execution memory region 106 in the address information column of the user process control table 103.

In consequence, the process of the application program 129 being executed in the host computer 121 can be registered as the process awaiting the execution in the user computer 101. An environment where the application program 129 is not executed can be realized.

Figure 8:
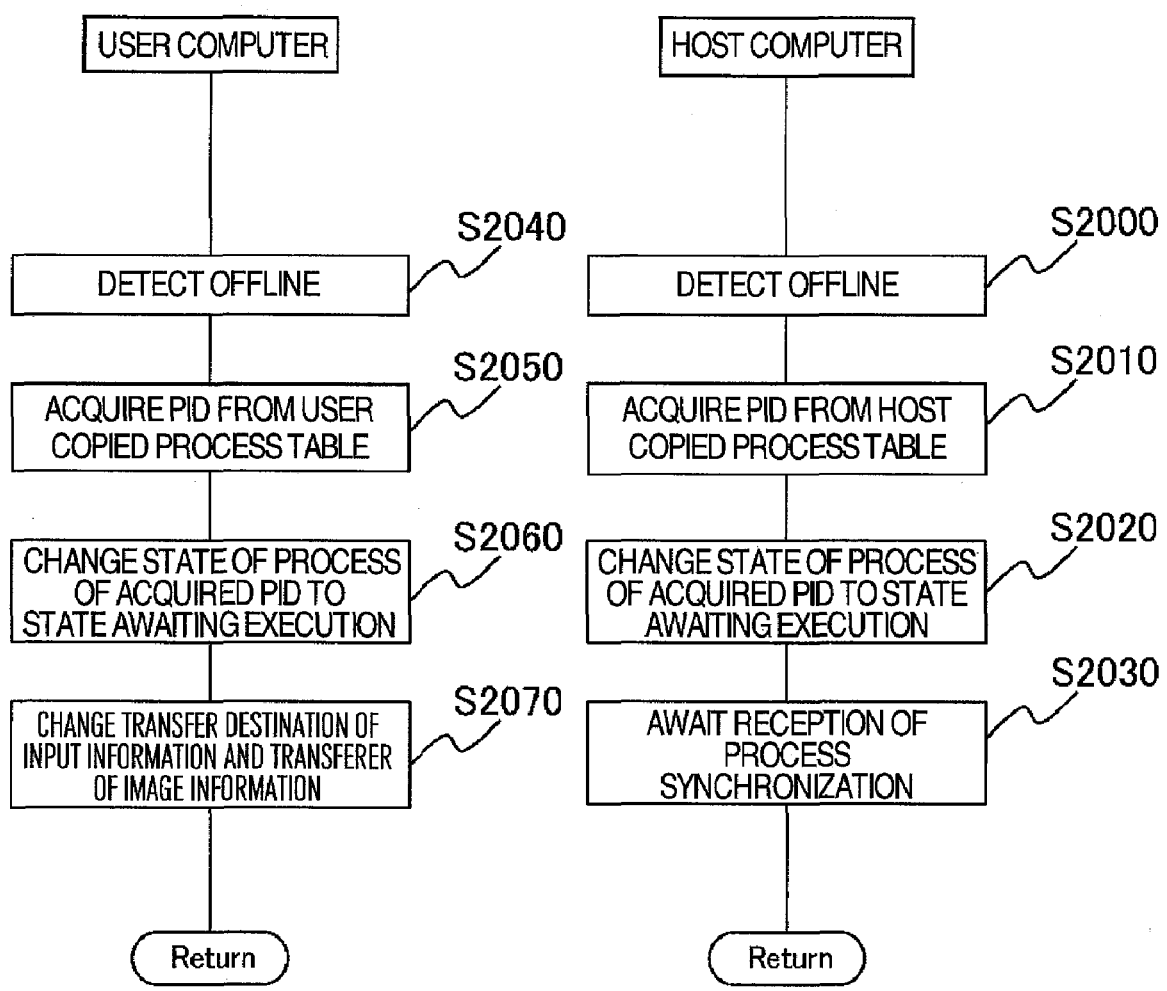
FIG. 8 is a flow chart showing an example of a flow of processing at a time when fault is detected in a network.

FIG. 8 shows an example of processing in a case where fault is detected in communication between the user computer 101 and the host computer 121 in the information processing system 1000 according to the present embodiment.

It is to be noted that in the following description, it is sometimes described that "the connection via the network is cut", "the offline is detected" and the like. This description includes the cable or radio network 140 of the present embodiment. When data cannot be transmitted or received via the network 140 regardless of whether a cable constituting the network 140 is physically cut or not, it is described that the connection via the network is cut or the like.

Moreover, an example in which the data cannot be transmitted or received via the network 140 will hereinafter be described. The present embodiment is not limited to a case where the data cannot be transmitted or received, and is similarly applicable to, for example, a case where data which does not meet any communication protocol is received from a partner side and a case where a skipped bit, a check sum error, delay of data and the like are detected in the data to be transmitted or received.

On detecting that the connection via the network is cut (S2000), the host AP control unit 127 acquires the PID recorded in the host copied process table 124 (S2010), and changes the state of each process specified by the acquired PID to the state awaiting execution (S2020). Moreover, each process is brought into a state awaiting reception of process synchronization (S2030).

The host AP control unit 127 may judge whether or not the connection via the network is cut immediately after it is detected that the data received from the partner side does not follow any protocol, or may judge in a case where any data is not transmitted from the partner side for a predetermined period.

On the other hand, on detecting that the connection via the network is cut (S2040), the user AP control unit 107 acquires the PID recorded in the user copied process table 104 (S2050), and changes the state of each process specified by the acquired PID to the executable state (S2060). When the connection via the network is cut, the input transfer unit 111 changes a transfer destination of the input information from the host computer 121 to the user processing unit 108 of the user computer 101. The image reception device 109 displays, in the display unit 112, an image received from the user processing unit 108 of the user computer 101 itself (S2070).

The user AP control unit 107 may judge whether or not the connection via the network is cut immediately after it is detected that the data received from the partner side does not follow any protocol, or may judge in a case where any data is not transmitted from the partner side for a predetermined period. The user AP control unit may periodically issues a response request such as Ping to the host computer, and may judge whether or not the connection is cut in a case where any response is not made to the request.

In consequence, even when the connection via the network is cut, the operator can continuously execute the application program 129 executed by the host computer 121 with the user computer 101. The information input by the input unit 113 of the user computer 101 and sent to the host computer 121 via the network 140 at a time when the remote operation is performed is sent to the user processing unit 108 of the user computer 101 in a case where the connection via the network is cut. Therefore, the operator can operate an application which is executable with the user computer 101. When the connection via the network is cut, the image processed by the user processing unit 108 of the user computer 101 is displayed in the display unit 112 of the user computer 101. Therefore, the operator can see a result of the operation of the application which is executable with the user computer 101. In consequence, for example, when the host computer 121 edits the document with a document editing application, the user computer 101 can continue the edit of the document.

Figure 9:
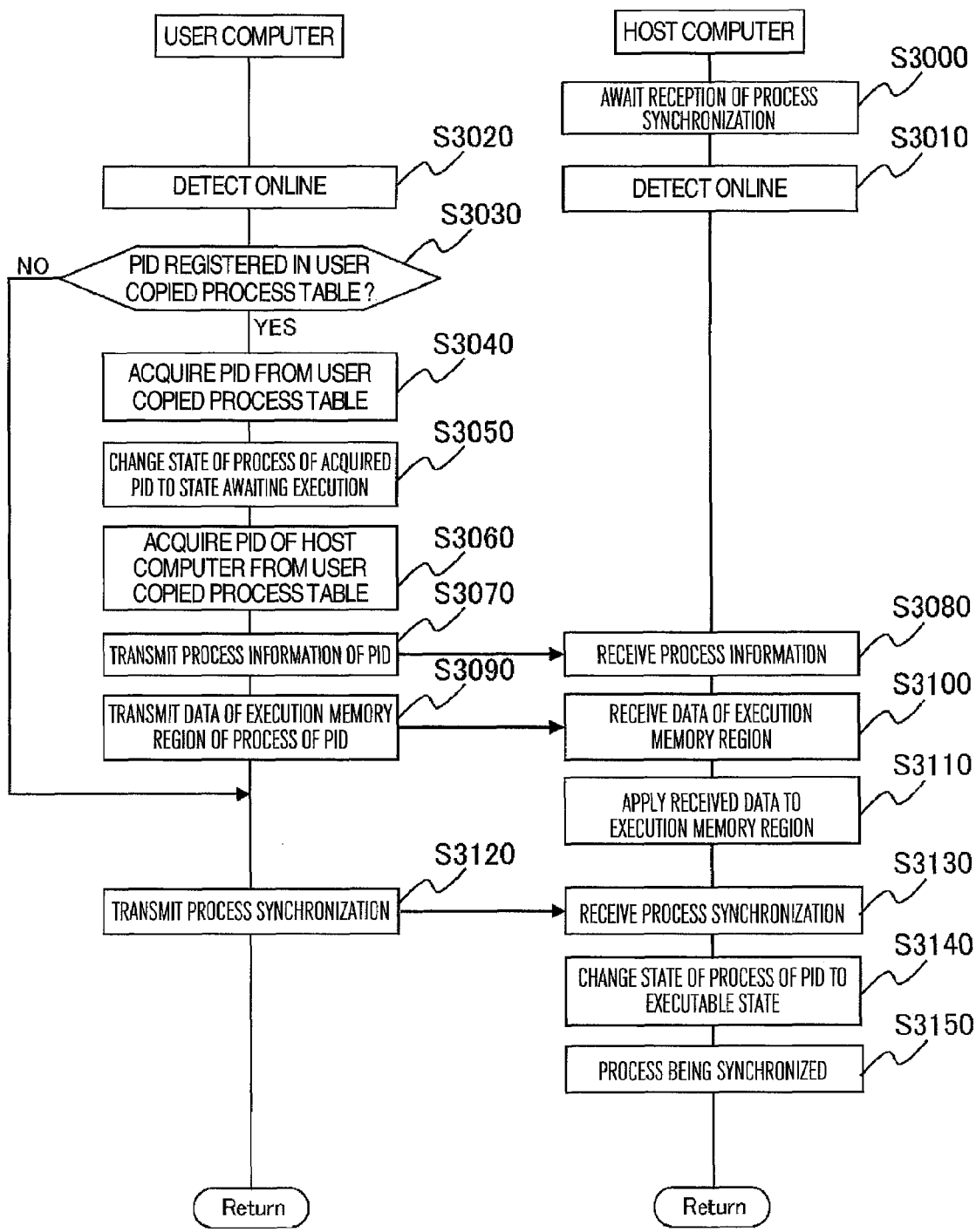
FIG. 9 is a flow chart showing an example of a flow of processing at a time when network restoration is detected.

FIG. 9 shows an example of processing in a case where the communication between the user computer 101 and the host computer 121 returns to a normal state in the information processing system 1000 according to the present embodiment.

When the connection via the network is resumed, the user AP control unit 107 is on standby for a certain period set beforehand by the operator. On confirming that the connection via the network is continuously secured for a certain period, it is judged that the connection via the network is restored (S3020). When a response request such as Ping is periodically issued to the host computer and a response to the request can be confirmed, it may be judged that the connection via the network is restored.

Next, in a case where the user computer 101 judges with reference to the user copied process table 104 that the PID is not registered in the user copied process table 104, the user computer transmits the process synchronization to the host AP control unit 127 (S3030, S3120).

On the other hand, in a case where the PID is registered in the user copied process table 104, the user computer 101 acquires, from the user copied process table 104, the PID of the process executed by the user computer 101 (S3040), and changes the state of the process specified by the acquired PID to the state awaiting the execution (S3050). In consequence, the process executed by the user computer 101 is stopped.

Subsequently, the user computer 101 acquires, from the user copied process table 104, the PID of each process changed to the state awaiting the execution in the host computer 121, and notifies the host AP control unit 127 (S3060, S3070 and S3080).

Furthermore, the user computer 101 transmits, to the user AP control unit 107, the process information of the above process and the data of the user execution memory region 106, and transmits the process synchronization to the host AP control unit 127 (S3090, S3100 and S3120).

On the other hand, each process executed by the host computer 121 is brought into a state awaiting reception of the process synchronization for a period when the connection via the network is cut. The host AP control unit 127 receives the PID from the user AP control unit 107 (S3080). On receiving the process information and the data of the execution memory region (S3100), the host AP control unit overwrites the received process information in the host process control table 123, and overwrites the data of the execution memory region in the host execution memory region 125.

Moreover, in the user computer 101, when the configuration data of each process specified by the PID registered in the user copied process table 104 is all overwritten in the memory 122 of the host computer 121, the user AP control unit 107 transmits the process synchronization to the host computer 121 (S3120). In this case, the host AP control unit 127 receives the process synchronization (S3130), and changes the state of each process to the executable state (S3140). In consequence, each process of the host computer 121 is brought into a state of the process being synchronized (S3150).

Here, in a case where the connection via the network is again cut while the process is being synchronized, the user AP control unit 107 of the user computer 101 does not transmit the process synchronization, and returns each process brought into the state awaiting the execution in the step S3050 to the executable state.

Moreover, when the connection via the network is resumed and the process synchronization is completed, the input transfer unit 111 changes the transfer destination of the input information from the user processing unit 108 to the host computer 121. The image reception device 109 displays the image received from the host computer 121 in the display unit 112.

In consequence, the operator may continuously execute the application which has been operated and executed by the user computer 101 with the host computer 121 for a period when the connection via the network is cut. The data changed in a case where the application is executed by the user computer 101 can be reflected in the host computer 121.

As described above, the user AP control unit 107 waits for a certain period designated beforehand by the operator from the time when the connection via the network is resumed until the user AP control unit judges that the connection via the network has been restored. When the process synchronization is started, the connection via the network is stabilized. As a consequence, a possibility the connection via the network is again cut during the process being synchronized and the data transmitted to the host computer 121 in the steps S3070 and S3090 is wasted may be reduced.

Moreover, when the connection via the network is cut again before the synchronization of the process is completed, the user computer 101 continuously executes the application. Therefore, even if the connection via the network is not stabilized and is intermittently cut, the user computer 101 can continue the execution of the application.

To improve a security level, when the application and the data are loaded on the memory 102 of the user computer 101, the user computer 101 may execute the following processing.

Figure 10:
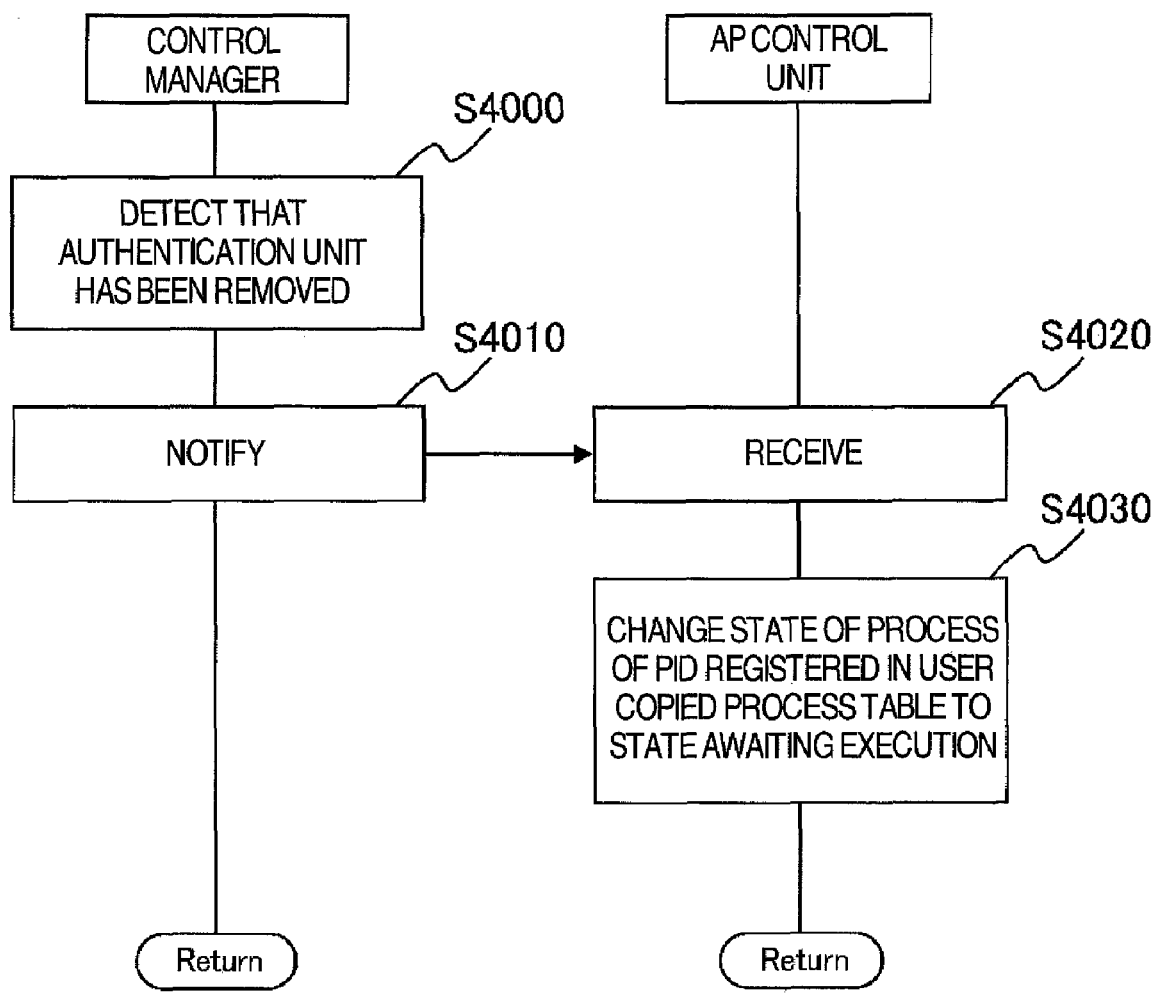
FIG. 10 is a flow chart showing an example of a flow of processing at a time when an authentication unit is detached.

FIG. 10 shows an example of processing to be performed when the user computer 101 detects that the authentication unit 114 has been removed while the connection via the network is cut.

The control manager 110 detects that the authentication unit 114 has been removed, and notifies the user AP control unit 107 (S400, S4010). On receiving the notification, the user AP control unit 107 changes the state of each process specified by the PID registered in the user copied process table 104 to the state awaiting the execution (S4010 to S4030).

In consequence, when the authentication unit 114 is removed while the connection via the network is cut, the application loaded on the memory 102 of the user computer 101 may be prevented from being used.

Figure 11:
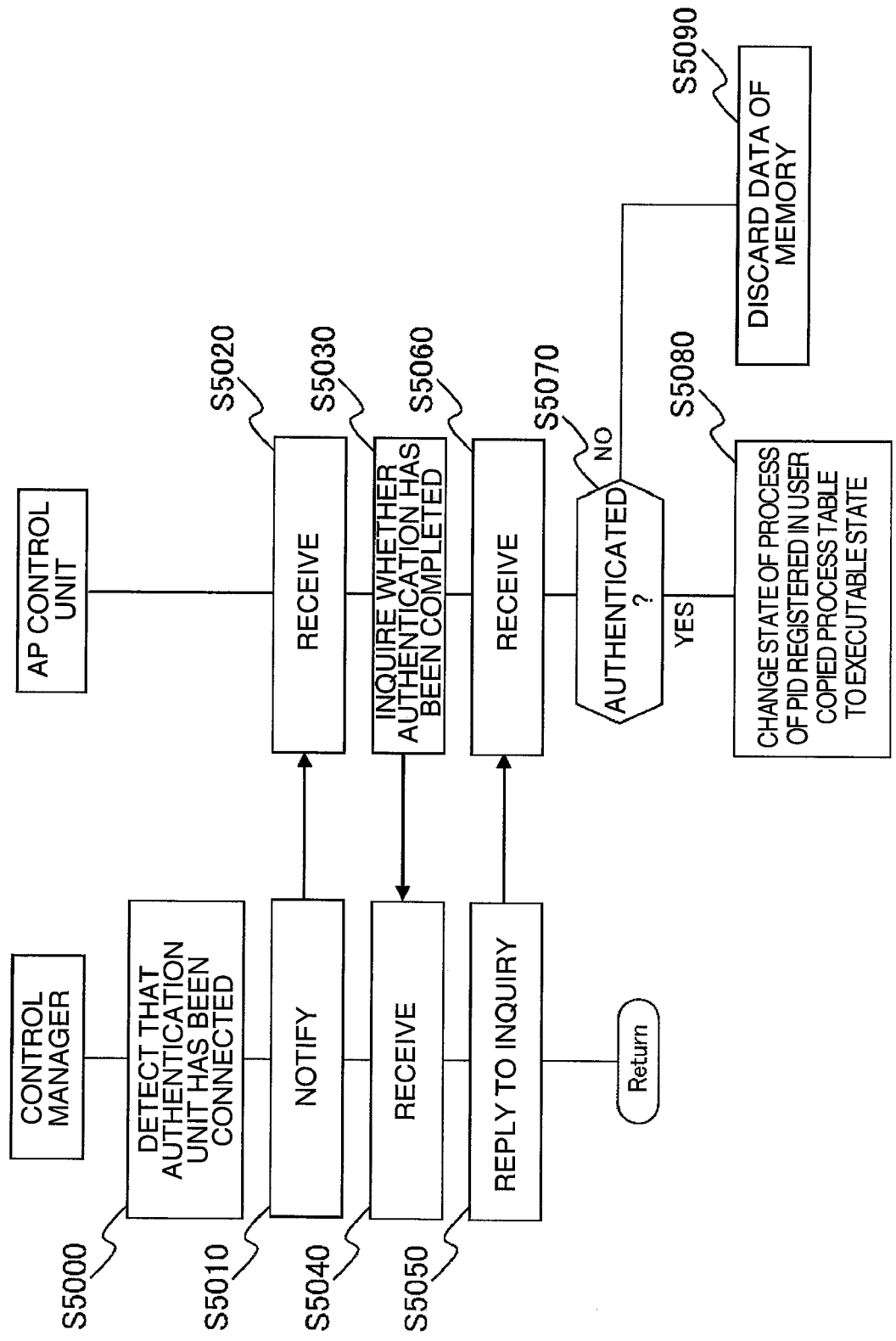
FIG. 11 is a flow chart showing an example of a flow of processing at a time when the authentication unit is reconnected.

FIG. 11 shows an example of processing to be performed by the user computer 101 in a case where the authentication unit 114 is reconnected while the connection via the network is cut.

The control manager 110 detects that the authentication unit 114 has been connected, and notifies the user AP control unit 107 (S5000 to S5020).

On receiving the notification, the user AP control unit 107 inquires the control manager 110 whether or not the authentication unit 114 has been authenticated (S5030). On receiving the inquiry (S5040), the control manager 110 replies whether or not the authentication unit 114 has been authenticated based on the information retained by the control manager 110 (S5050).

The user AP control unit 107 receives a result of the inquiry (S5060). When the authentication unit 114 is authenticated, the user AP control unit judges that the authentication unit 114 has been reconnected by the same operator, and changes the state of each process specified by the PID registered in the user copied process table 104 to the executable state (S5070, S5080).

Moreover, when the authentication unit 114 is not authenticated, the user AP control unit judges that the authentication unit 114 is reconnected by another operator, and discards each data of the user process control table 103, the user copied process table 104 and the user execution memory region 106 of the memory 102 (S5070, S5090).

In consequence, in a case where the authentication unit 114 is reconnected, when the authentication unit is authenticated, the application may be used again. When the authentication unit is not authenticated, the information of the application can be discarded from the memory 102. In consequence, the information stored in the memory 102 of the user computer 101 can be prevented from being leaked to the third party.

According to the present embodiment, when the connection via the network is cut while the application is executed and the application cannot be used in the user computer 101 which is not connected to the authentication unit 114, when another operator is to operate the user computer 101 by use of another authentication unit 114, the information of the application is discarded from the memory 102. In consequence, a high security level can be realized.

The present embodiment has been described above. According to the present embodiment described above, even when the fault is generated in the communication between the user computer 101 which has accepted the operation input and the host computer 121 which executes the information processing in response to the operation input, the information processing in response to the operation input can be continued.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information processing system comprising a first information processing device and a second information processing device, the first information processing device comprising:
an input transmitting unit for transmitting input data to the second information processing device; and
a communication monitoring unit for monitoring communications between the first information processing device and the second information processing device;

the second information processing device comprising:
a program storing unit for storing a program, the program being requested to execute by the first information processing device;
a process executing unit for executing a process based on the program;
a transmitting unit for receiving the input data from the first information processing device, transferring the received input data to the process for execution with the process by the process execution unit based on the input data and sending a result of the executed result of the process by the process execution unit to the first information processing device;
an execution monitoring unit for monitoring whether the process starts running; and
a program control unit responsive to a detection by the execution monitoring unit that the process starts running, for transmitting one or more program modules related to the process being executed, to the first information processing device, the one or more program modules being run with the process being executed;

the first information processing device further comprising:
a program receiving unit for receiving the one or more program modules sent from the second information processing device; and a program executing unit for executing a new process based on the received one or more program modules in response to a detection of a communication error between the first information processing device and the second information processing device, the error being detected by the communication monitoring unit;

wherein in response to the detection of the communication error, the input data transmitting unit transfers the input data to the new process executed by the program executing unit, and the user interface outputs a result of the new process executed by the program executing unit based on the input data.

2. The information processing system according to claim 1, wherein:

when the communication monitoring unit detects that the communication between the first information processing device and the second information processing device has returned to a normal state, the execution monitoring unit transmits information and data of the new process to the second information processing device; and the program control unit receives the information and data of the new process transmitted from the first information processing device, and resumes the execution of the process based on the received information and data from the first information processing device.

3. The information processing system according to claim 1, wherein the one or more program modules related with the process realize functions performed by executing the process;

wherein a storage unit of the second information processing device records a data size of each of the one or more program modules; and wherein the program control unit transmits the one or more program modules to the first information processing device so that a total value of the data sizes of the one or more program modules transmitted to the first information processing device does not exceed a predetermined value.

4. The information processing system according to claim 2, wherein when it is not detected for a predetermined period that the communication error has occurred between the first information processing device and the second information processing device, the communication monitoring unit detects that the communication between the first information processing device and the second information processing device has returned to the normal state.

5. The information processing system according to claim 1, wherein the first information processing device monitors a free capacity of a memory of the first information processing device, compares the free capacity with a predetermined value, and discontinues writing of the one or more program modules transmitted from the second information processing device in the memory in accordance with a result of the comparison.

6. The information processing system according to claim 1, wherein the first information processing device monitors whether or not an authentication unit which specifies an operator of the first information processing device is mounted, and discontinues the execution of each process when it is detected that the authentication unit has been removed.

7. The information processing system according to claim 1, wherein the first information processing device comprises a user interface for outputting the result received from the second information processing device.

8. The information processing system according to claim 1, wherein the one or more program modules related to the process constitute the process.

9. An information processing method of an information processing system comprising a first information processing device and a second information processing device, comprising:

transmitting input data by the first information processing device to the second information processing device receiving the input data by the second information processing device;

monitoring, by the first information processing device, communications between the first information processing device and the second information processing device;

executing, by the second information processing device, a process based on a program to be requested by the first information processing device execute, the process being executed based on the input data;

sending an executed result of the process by the second information processing device to the first information processing device;

monitoring whether the process starts running;

transmitting, by the second information processing device to the first information processing device, responsive to a detection that the process starts running, one or more program modules related to the process having been executed, the one or more program modules being run with the process being executed;

receiving, by the first information processing device, the one or more program modules sent from the second information processing device; and executing, by the first information processing device, a new process based on the received one or more program modules in response to a detection of a communication error between the first information processing device and the second information processing device;

wherein, in response to the detection of the communication error, the input data transmitting unit transfers the input data to the new process executed by the program executing unit, and a user interface outputs a result of the new process executed by the program executing unit based on the input data.

10. The information processing method according to claim 9, further comprising, when it is detected that the communication between the first information processing device and the second information processing device has returned to a normal state, transmitting information and data of the new process from the first information processing device to the second information processing device; and receiving, by the second information processing device, the information and data of the new process transmitted from the first information processing device, and resuming the execution of the process based on the received information and data from the first information processing device.

11. The information processing method according to claim 10, wherein the communication error is detected in the communication between the first information processing device and the second information processing device when no data is transmitted from the second information processing device for a predetermined period; and wherein the communication between the first information processing device and the second information processing device returns to the normal state when it is not detected for a predetermined period that the communication error has occurred in the communication between the first information processing device and the second information processing device.

12. The information processing method according to claim 9, wherein the one or more program modules related with the process realize functions performed by executing the processes; and the method further comprises:

recording a data size of each of the one or more program modules; and transmitting the one or more program modules to the first information processing device such that a total value of the data sizes of the one or more program modules transmitted to the first information processing device does not exceed a predetermined value.

13. The information processing method according to claim 9, wherein when no data is transmitted from the second information processing device for a predetermined period, the communication error is detected in the communication between the first information processing device and the second information processing device.

14. The information processing method according to claim 9, further comprising: monitoring, by the first information processing device, an available capacity of a memory of the first information processing device; comparing the available capacity with a predetermined value; and discontinuing writing of the one or more program modules transmitted from the second information processing device in the memory in accordance with a result of the comparison.

15. The information processing method according to claim 9, further comprising: monitoring, monitoring by the first information processing device, whether or not an authentication unit which specifies an operator of the first information processing device is mounted, and discontinuing the execution of each process when it is detected that the authentication unit has been removed.

16. The information processing method according to claim 9, further comprising outputting the executed result received from the second information processing device by a user interface of the first information processing device.

17. The information processing method according to claim 9, wherein the one or more program modules related with the process constitute the process.

* * * * *